(12) United States Patent
Chang et al.

(10) Patent No.: US 6,746,041 B2
(45) Date of Patent: Jun. 8, 2004

(54) PORTABLE AIR BAG SYSTEM

(76) Inventors: Jo Won Chang, #138-307 Hanbit Apt. Eoeun-dong, Yusung-ku, Daejun-si 305-333 (KR); Su Jin Chang, #138-307 Hanbit Apt. Eoeun-dong, Yusung-ku, Daejun-si 305-333 (KR)

( * ) Notice: Subject to any disclaimer, the term of this patent is extended or adjusted under 35 U.S.C. 154(b) by 16 days.

(21) Appl. No.: 10/067,201

(22) Filed: Feb. 7, 2002

(65) Prior Publication Data
US 2003/0146610 A1 Aug. 7, 2003

(51) Int. Cl.[7] ............................................. B60R 21/22
(52) U.S. Cl. .................. 280/730.1; 280/735; 280/733
(58) Field of Search ............................ 280/735, 728.2, 280/733, 743.1, 748, 751, 730.1

(56) References Cited

U.S. PATENT DOCUMENTS

| | | | | |
|---|---|---|---|---|
| 5,162,006 A | * | 11/1992 | Yandle, II | 441/96 |
| 5,242,193 A | * | 9/1993 | Humpal | 280/733 |
| 5,362,098 A | * | 11/1994 | Guill | 280/733 |
| 5,472,230 A | * | 12/1995 | Every et al. | 280/728.2 |
| 5,492,359 A | * | 2/1996 | Oliver | 280/728.1 |
| 5,794,971 A | * | 8/1998 | Boydston et al. | 280/733 |
| 5,863,065 A | * | 1/1999 | Boydston et al. | 280/733 |
| 5,924,726 A | * | 7/1999 | Pan | 280/733 |
| 6,027,138 A | * | 2/2000 | Tanaka et al. | 280/735 |
| 6,062,596 A | * | 5/2000 | Boydston et al. | 280/733 |
| 6,325,412 B1 | * | 12/2001 | Pan | 280/733 |

* cited by examiner

Primary Examiner—Paul N. Dickson
Assistant Examiner—Faye M. Fleming
(74) Attorney, Agent, or Firm—Birch, Stewart, Kolasch & Birch, LLP

(57) ABSTRACT

A portable airbag system including a portable airbag mechanism which may be carried and moved by a vehicle occupant. The airbag system includes an impact sensor operated independently from or in cooperation with at least one fixed airbag mechanism mounted in a motor vehicle. The portable airbag mechanism has arranged therein an airbag which is inflated and deployed upon occurrence of a vehicle collision. A controller applies an actuating signal to the portable airbag mechanism when the vehicle collision is sensed, thereby allowing the bag arranged in the portable airbag mechanism to be inflated and deployed.

20 Claims, 5 Drawing Sheets

PORTABLE AIR BAG SYSTEM

BACKGROUND OF THE INVENTION

1. Field of the Invention

The present invention relates to an air bag system, and more particularly, the present invention relates to a portable air bag system which is constructed in such a way as to be carried and moved, which cooperates, upon a head-on, rear-end or side collision, with a fixed air bag system already mounted to a motor vehicle, to protect occupants, and which has a toy-like configuration to suit children's tastes.

2. Description of the Related Art

Generally, an air bag system is mounted to a motor vehicle to protect, for example, upon head-on collision, a driver and/or an occupant seating on a front seat from being bumped against an instrument panel or a front windshield glass.

The conventional air bag system comprises an impact sensing unit for sensing a vehicle impact and an air bag module for inflating or deploying an air bag when an impact is sensed. The impact sensing unit includes a sensor device, a battery, a diagnosis device, etc., and the air bag module includes the air bag, an inflator, a gas generator, etc.

In the air bag system, upon occurrence of a head-on, rear-end or side collision, an electrical signal which is generated by the sensor device is transmitted to the inflator. With this, the inflator is ignited or fired to inflate or deploy the air bag. Immediately after the air bag is inflated or deployed, an inflated gas is discharged out of the air bag not to cause injury to the face and the upper body part of an occupant.

Air bags are largely divided into a driver air bag, a passenger air bag and a side air bag. The driver air bag is placed, under a folded status, in a steering handle adjacent to an inflator which is arranged in the steering handle or a steering column. The passenger air bag is placed in the instrument panel, and the side air bag is placed in a seat or a door of the motor vehicle.

However, the conventional air bag system as described above suffers from defects in that, since the air bag is fixedly placed, at least one air bag should be provided for each seat, whereby a cost cannot but be increased by the necessity of installing a number of air bags. In this regard, because the air bag cannot be moved to another place, it is impossible to protect an occupant seating on another seat for which the air bag is not provided.

Also, in the conventional air bag system which is wirelessly and remotely actuated, in the course of sensing a vehicle impact and transmitting an impact sensing signal, radio disturbance can be caused, and the air bag is likely to be mis-actuated by a radio signal outputted from another motor vehicle.

SUMMARY OF THE INVENTION

Accordingly, the present invention has been made in an effort to solve the problems occurring in the related art, and an object of the present invention is to provide a portable air bag system which is constructed in such a way as to be carried and moved, which is actuated, upon a head-on, rear-end or side collision, simultaneously with or independently from a fixed air bag system already mounted to a motor vehicle, to protect occupants, and which has a toy-like configuration to suit children's tastes.

In order to achieve the above object, according to the present invention, there is provided a portable air bag system comprising: impact sensing means operated independently from or in cooperation with at least one fixed air bag mechanism mounted to a motor vehicle for sensing a vehicle collision; a portable air bag mechanism capable of being carried and moved by a vehicle occupant, the portable air bag mechanism having arranged therein an air bag which is inflated and deployed upon occurrence of the vehicle collision; and control means for applying an actuating signal to the portable air bag mechanism when the vehicle collision is sensed by the impact sensing means, and thereby allowing the air bag arranged in the portable air bag mechanism to be inflated and deployed. While the portable air bag mechanism can be manufactured to have various configurations, it is preferred in consideration of safety of a child that the portable air bag mechanism is manufactured to have a configuration of a plaything which can be carried by the child.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF PREFERRED EMBODIMENTS

Figure 1:
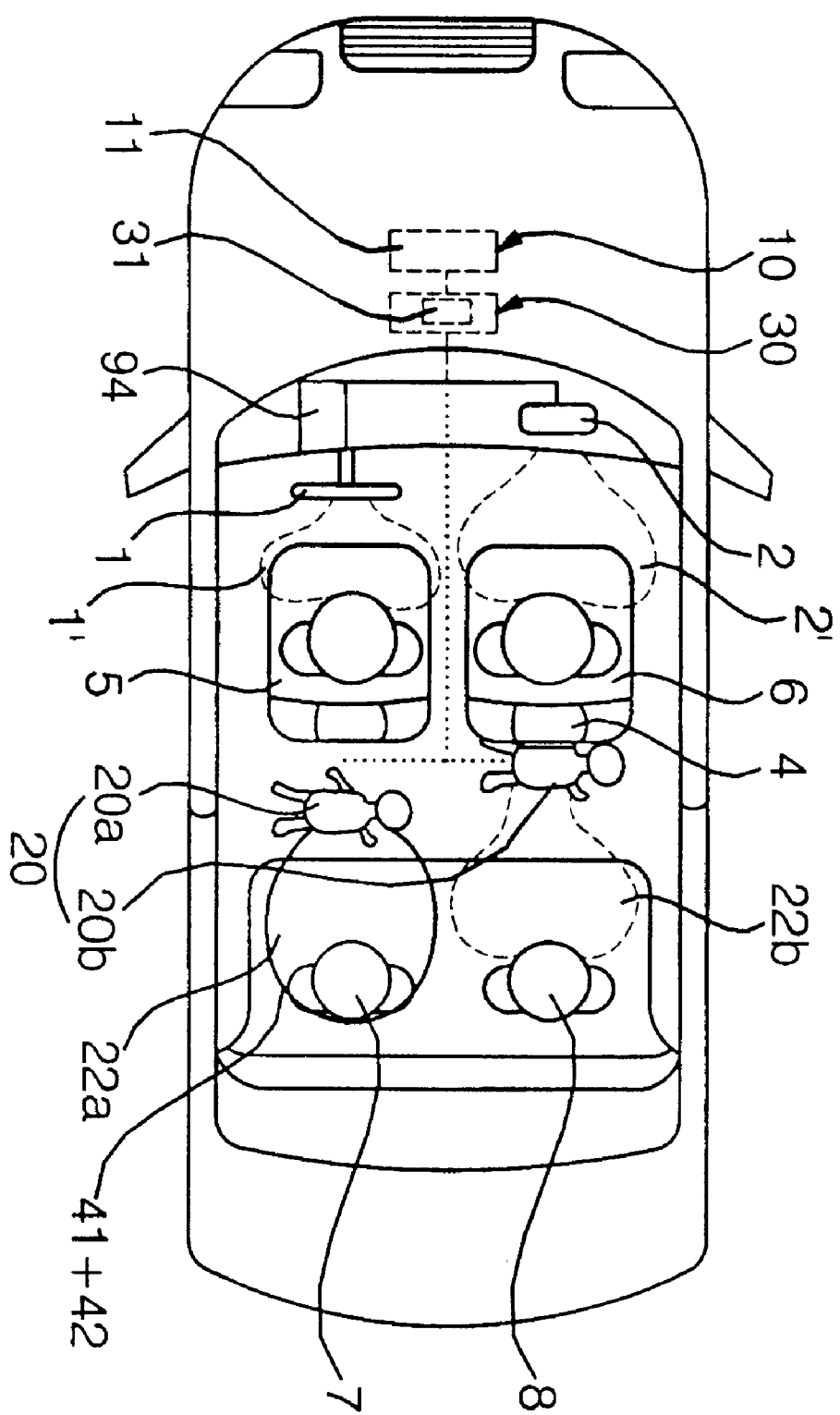
FIG. 1 is a schematic plan view illustrating a portable air bag system in accordance with an embodiment of the present invention.

Reference will now be made in greater detail to a preferred embodiment of the invention, an example of which is illustrated in the accompanying drawings. Wherever possible, the same reference numerals will be used throughout the drawings and the description to refer to the same or like parts.

Figure 2:
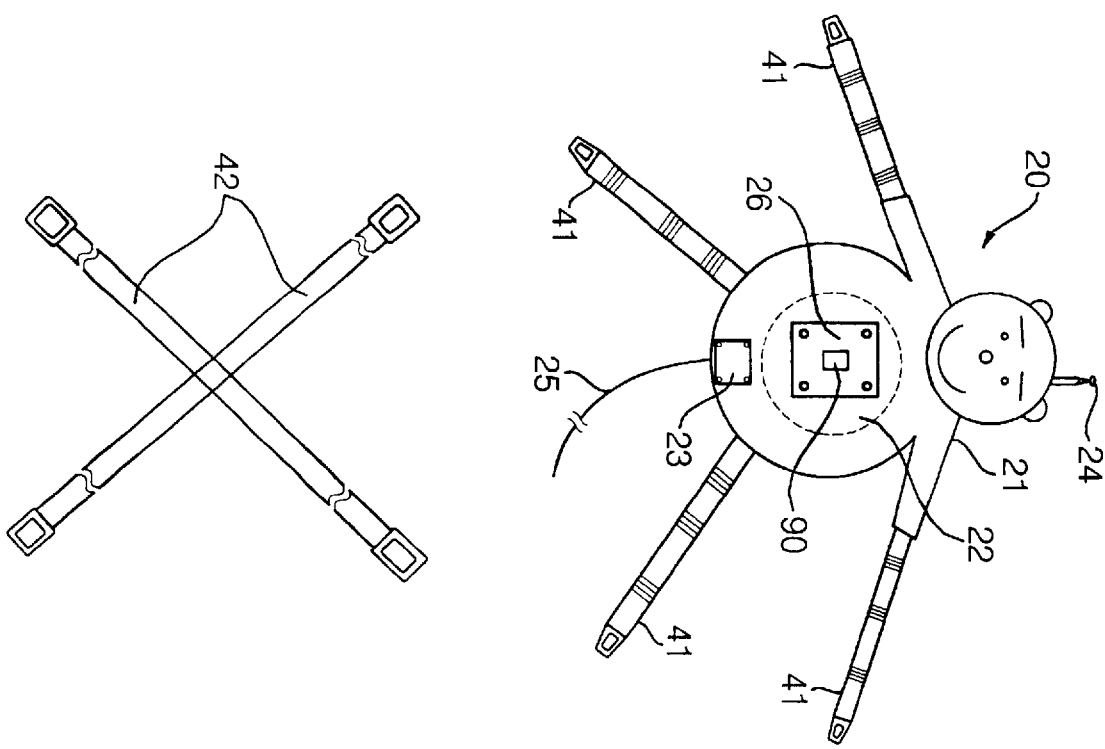
FIG. 2 is a front view independently illustrating a portable air bag and belts according to the present invention.

FIG. 1 is a schematic plan view illustrating a portable air bag system in accordance with an embodiment of the present invention, and FIG. 2 is a front view independently illustrating a portable air bag and belts according to the present invention.

As shown in FIGS. 1 and 2, a portable air bag system in accordance with an embodiment of the present invention comprises an impact sensing device 10 for sensing a vehicle collision and thereby for allowing fixed air bag mechanisms 1 and 2 mounted to a motor vehicle to be actuated, a portable air bag mechanism 20 capable of being carried and moved by a vehicle occupant and having arranged therein an air bag 22 which is inflated upon occurrence of the vehicle collision, and a control device 30 for applying an actuating signal to the portable air bag mechanism 20 when the vehicle collision is sensed by the impact sensing device 10 and thereby for allowing the air bag 22 arranged in the portable air bag mechanism 20 to be inflated.

It is preferred that a safety device (not shown) is provided to prevent the air bag 22 from being actuated by a shock while the motor vehicle is not moved.

The impact sensing device 10 comprises an impact sensor 11 which senses a head-on, rear-end or side collision and generates an electrical signal.

A plurality of portable air bag mechanisms 20 are located in the motor vehicle so that a number of occupants can use the portable air bag mechanisms 20 at different positions, respectively. The portable air bag mechanism 20 comprises an air bag body 21; an air bag 22 arranged in the air bag body 21, for being inflated by gas flowed therein through an inflator (not shown); a transmitter/receiver unit 24 positioned on a side of the air bag body 21, for wirelessly receiving an actuation signal upon occurrence of the collision and transmitting the actuation signal to an internal communication device 23 so that the air bag 22 is actuated under the control of the control device 30; and a wired communication cable 25 for wiredly connecting the internal communication device 23 and the control device 30 with each other, upon occurrence of the collision, so that the air bag 22 is actuated under the control of the control device 30.

The inflator is installed at the same position as the air bag 22 in a center portion of the air bag body 21, or at a different position such as in a front seat, to be connected to the air bag 22 via an air tube (not shown).

The air bag 22 can be arranged in front of or behind the air bag body 21. Also, the air bag 22 can be arranged in a front portion or a rear portion of the air bag body 21. The air bag body 21 and the air bag 22 can be disassembled from each other to be changed with new ones. To this end, an openable and closable closure member 26 is connected to the air bag body 21.

Further, the air bag body 21 is manufactured to have a variety of configurations so that the general public can conveniently use the air bag body 21 while not developing a hatred for it.

In particular, in consideration of safety of children, the air bag body 21 is manufactured to have a variety of configurations such as a doll, a robot, a cushion, a pillow, a toy, etc. with which the children can have a merry time.

The portable air bag mechanism 20 is provided with a fastening device for allowing the portable air bag mechanism 20 to be fastened with respect to the body of the occupant or a front seat back, so that the portable air bag mechanism 20 is prevented from being freed from the body of the occupant. The fastening device comprises main belts 41 connected to the portable air bag mechanism 20 and auxiliary belts 42 formed separately from the main belts 41 and locked at their both ends to the main belts 41 to fasten the portable air bag mechanism 20 with respect to the body of the occupant. Alternatively, the fastening means comprises a hanger member 4 which is attached to the front seat back to hang the portable air bag mechanism 20b.

The main belts 41 are connected to the portable air bag mechanism 20 to serve as both hand parts and both foot parts of the portable air bag mechanism 20, respectively, and the auxiliary belts 42 define an X-shaped contour and locked at their both ends to the main belts 41.

The main belts 41 and the auxiliary belts 42 are made of resilient material so that the occupant can move the portable air bag mechanism 20 from the body within a predetermined range. Occupants seating on a rear seat in a state wherein they wear the main belts 41 and the auxiliary belts 42 are shown in FIG. 1.

The control device 30 comprises a control section 31. The control section 31, which receives a signal from the impact sensing device 10 when the vehicle collision is sensed by the impact sensing device 10, enables the air bag 22 to be actuated by the medium of wireless communication through the transmitter/receiver unit 24 positioned on the side of the portable air bag mechanism 20 and the internal communication device 23 disposed in the portable air bag mechanism 20. Alternatively, the control section 31 is connected with the internal communication device 23 by a wired communication cable 25 and enables the air bag 22 to be actuated by the medium of wired communication through the control section 31 and the internal communication device 23.

The portable air bag mechanism 20 is connected with a plurality of fixed air bag mechanisms 1 and 2 mounted to the motor vehicle, through wired or wireless communication, so that, upon occurrence of the vehicle collision, when at least one of the fixed air bag mechanisms 1 and 2 is actuated, the portable air bag mechanism 20 can be actuated within 78 milliseconds thereafter.

Also, in the portable air bag system according to the present invention, an inflation velocity and a pressure of the air bag 22, and force for tightening the main and auxiliary belts 41 and 42 can be adjusted. Further, whether or not the air bag 22 is inflated is determined depending upon a nature of a colliding object. Therefore, application of the portable air bag system according to the present invention can be altered in various ways.

A portable air bag system in accordance with another embodiment of the present invention comprises an impact sensing device 10 operated independently from or in cooperation with fixed air bag mechanisms 1 and 2 mounted to a motor vehicle, for sensing a vehicle collision; a portable air bag mechanism 20 capable of being carried and moved by a vehicle occupant and having arranged therein an air bag 22 which is inflated and deployed upon occurrence of the vehicle collision; and a control device 30 for applying an actuating signal to the portable air bag mechanism 20 when the vehicle collision is sensed by the impact sensing device 10, and thereby allowing the air bag 22 arranged in the portable air bag mechanism 20 to be inflated and deployed.

At this time, in order to obviate a possibility of the portable air bag system to be adversely influenced by a radio signal generated by other motor vehicles, individual serial numbers are assigned to respective motor vehicles. A serial number assigned to a motor vehicle is stored in an identification key module 94 as shown in FIG. 1. Accordingly, upon riding on the motor vehicle, as an occupant inserts or brings identification key sensing means 90 attached to the portable air bag mechanism 20 in or into contact with the identification key module 94, the portable air bag mechanism 20 can recognize the serial number of the motor vehicle on which it is positioned. In this connection, it can also be envisaged that an identification key module storing an individual serial number is mounted to the portable air bag mechanism 20 and the identification key sensing means 90 is attached to the motor vehicle, in such a way as to reverse serial number storing and verifying functions.

Figure 3:
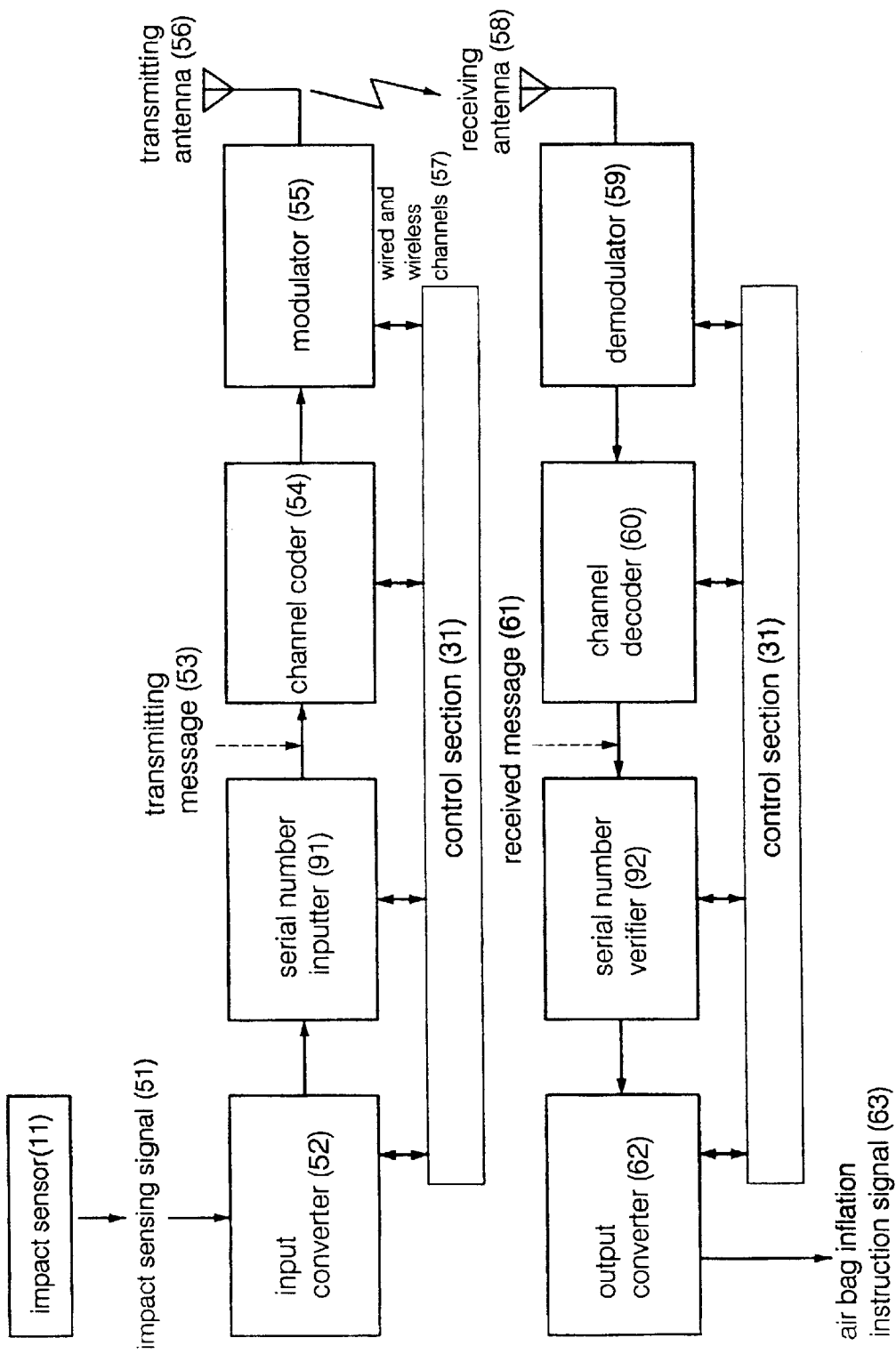
FIG. 3 is a block diagram illustrating a communication system which is adopted in the portable air bag system according to the present invention.

Hence, even in the case that an occupant rides on another vehicle, as in the above-described way, since the portable air bag mechanism 20 can recognize a serial number of the corresponding motor vehicle on which he or she rides, compatibility of the portable air bag system according to the present invention between vehicles is ensured FIG. 3 is a block diagram illustrating a communication system which is adopted in the portable air bag system according to the present invention.

As shown in FIG. 3, the portable air bag mechanism 20 can be actuated, independently from or in cooperation with actuation of the fixed air bag mechanisms 1 and 2 mounted to the motor vehicle, through wired or wireless communication. The portable air bag mechanism 20 receives a signal from the impact sensor 11 for sensing a vehicle collision and then inflates the air bag 22 arranged in the air bag body 21.

At this time, an impact sensing signal 51 which is sensed by the impact sensor 11 may be improper for communication (as in the case of pressure, temperature, simple shape of voltage or current, and so forth).

Therefore, the sensed signal is converted by an input transducer 52 into a type which is proper to communication, to serve as a transmitting message 53 for instructing inflation of the air bag 22. The input transducer 52 adds the individual serial number recognized from the identification key module 94 which is attached to the motor vehicle, to the transmitting message 53 through a serial number inputter 91.

Also, in order to ensure reliable transmission of the transmitting message 53 through wired and wireless channels 57, a channel coder 54 is provided. A signal passing through the channel coder 54 is modulated in a modulator 55, and then, transmitted from a transmitting antenna 56 through the wired and wireless channels 57 to a receiving antenna 58 of the portable air bag mechanism 20.

Transmission implemented in this way is controlled by the control section 31. Additionally, due to the fact that the same signal can be repeatedly transmitted through several times, operational reliability of the portable air bag system is improved.

Besides, supposing the case of error detection, the portable air bag system according to the present invention may have a function of restoring an original signal. In the case that an error is too large to restore and it is impossible to know the original signal, the portable air bag system according to the present invention may have a function of requiring re-transmission.

A signal received by the receiving antenna 50 of the portable air bag mechanism 20 is demodulated in a demodulator 59, and then, errors induced by the wired and wireless channels 57 are removed in a channel decoder 60 to be confirmed as a receiving message 61. In the confirming procedure, an output transducer 62 confirms through a serial number verifier 92 whether or not an inherent serial number of the motor vehicle added to the transmitting message 53 corresponds to a serial number stored in the identification key module 94 of the currently riding motor vehicle. As a consequence, when wirelessly transmitting an air bag inflation signal by assigning a specific coded key to each vehicle, it is possible to prevent the portable air bag system from being inflated by wirelessly receiving a signal generated from other motor vehicles.

The received message 61 is converted into an air bag inflation instruction signal 63 in the output transducer 62, and then, inflates the air bag 22 arranged in the portable air bag mechanism 20.

A device (not shown) can be provided to transform a transmitted control signal into a stable voltage capable of actuating the air bag 22 and to apply the transformed voltage. Also, it is preferred that a diagnosis device (not shown) for checking an operational status of the air bag 22, and a safety device (not shown) for preventing the air bag 22 from being actuated by a shock while the motor vehicle is not moved are provided.

Figure 4:
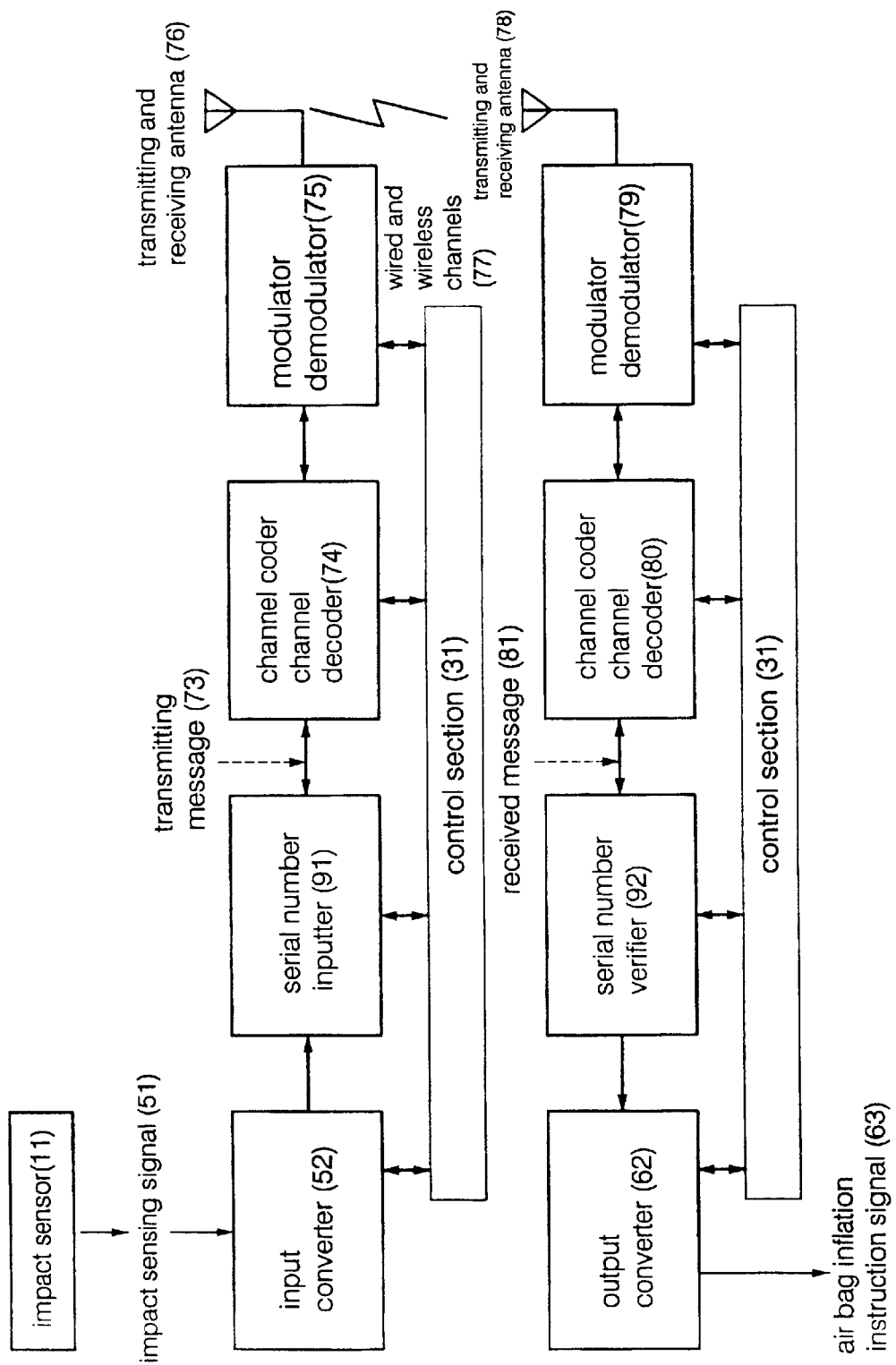
FIG. 4 is a block diagram illustrating another communication system which is adopted in the portable air bag system according to the present invention and additionally has a receiver-side error confirming function.

FIG. 4 is a block diagram illustrating another communication system which is adopted in the portable air bag system according to the present invention and additionally has a receiver-side error confirming function.

In FIG. 4, as for construction and operation of a communication system applied to a portable air bag system according to this embodiment of the present invention, since they are the same as in the above-described embodiment, detailed explanation thereof shall be omitted.

In this embodiment, a buffer capable of storing an individual serial number assigned by the serial number inputter 91 and the transmitting message 73 can be built in the control section 31, and the transmitting message 73 is transmitted through a transmitting and receiving antenna 76. A signal received by a transmitting and receiving antenna 78 of the portable air bag mechanism 20 is demodulated in a modulator/demodulator unit 79, and whether or not an error is detected is confirmed in a channel decoder 80. When an error is detected, it is possible to restore an original signal.

If an error is too large to restore or it is impossible to restore the original signal, a signal requiring repeated re-transmission of the same signal through several times may be transmitted to the transmitter through the transmitting and receiving antenna 78. Based on the bi-directional communication, by adding to the control section 31 a function for confirming an error on the wired and wireless channels 77, reliability of message transmission can be improved.

Hereinafter, working effects of the portable air bag system according to the present invention, constructed as mentioned above, will be described in detail.

The fixed air bag mechanisms 1 and 2 provided for a driver seat 5 and a front passenger seat 6 are respectively disposed in a steering handle and an instrument panel. Upon occurrence of a head-on collision, by a signal sensed by the impact sensor 11, air bags 1' and 2' respectively arranged in the fixed air bag mechanisms 1 and 2 are inflated and deployed, whereby a driver and an occupant seating on the front passenger seat 6 are prevented from being bumped against steering handle and the instrument panel.

In this case, even though occupants seating on a rear seat wear safety belts, it is impossible to perfectly prevent them from being bumped against the front seats.

While separate air bags are installed on front seat backs or built in doors, an installation or built-in procedure is complicated, and a cost is increased.

Accordingly, to cope with these problems, the portable air bag system capable of performing a function of a conventional air bag irrespective of a position of an occupant is provided according to the present invention. The portable air bag system is actuated by a signal sensed in the fixed air bag mechanisms 1 and 2 already mounted to the motor vehicle and then transmitted by wired and/or wireless communication.

To be more detailed, as the vehicle collision is sensed by the impact sensor 11 which allows the fixed air bag mechanisms 1 and 2 already mounted to the motor vehicle to be actuated, an actuation signal is transmitted to the portable air bag mechanism 20 through wired or wireless communication. Then, as the transmitter/receiver unit 24 of the portable air bag mechanism 20 receives the transmitted signal, the air bags 22a and 22b arranged in the portable air bag mechanism 20 are actuated.

Therefore, it is not necessary to separately install a sensor for sensing a vehicle collision. Instead, the air bags 22a and 22b of the portable air bag mechanism 20 can be actuated by the impact sensor 11 of the existing fixed air bag mechanisms 1 and 2.

Also, due to the fact that only one impact sensor 11 is installed and the portable air bag mechanisms 20a and 20b serving as playthings of a variety of configurations are connected to the impact sensor 11 through wired and/or wireless communication, the portable air bag mechanisms 20a and 20b can be effectively actuated. Moreover, in the case of using the wireless communication, by employing a channel coder and a channel decoder which are suitable for a communication channel characteristic, a function of repeatedly re-transmitting the same signal through several times, a mode of re-transmitting a transmitting message, a method recognizing an individual serial number inherently assigned to each motor vehicle, etc., reliability of wireless communication can be improved.

Due to the fact that the portable air bag mechanism 20 is connected with the plurality of fixed air bag mechanisms 1 and 2 already mounted to the motor vehicle through wired and/or wireless communication, upon occurrence of the vehicle collision, if at least one of the fixed air bag mechanisms 1 and 2 is actuated, the portable air bag mechanism 20 is actuated within 78 milliseconds thereafter, whereby improved operational reliability can be stably obtained.

In the meanwhile, while a child occupant 7 seating on the rear seat of the motor vehicle has a merry time with the portable air bag mechanism 20a according to the present invention, having a plaything-like configuration, in a state wherein the portable air bag mechanism 20a is fastened with respect to the upper body part of the child occupant 7 using the main and auxiliary belts 41 and 42, if the vehicle collision occurs, as the air bags respectively arranged in the existing fixed air bag mechanisms 1 and 2 are actuated, the air bag 22a arranged in the portable air bag mechanism 20a is also simultaneously actuated to protect the child occupant seating on the rear seat from being bumped against he front seat back.

When a child occupant 8 is bored with playing with the portable air bag mechanism 20b according to the present invention, having a plaything-like configuration such as a toy and the like, it is possible to hang the portable air bag mechanism 20b on the hanger member 4 of the front seat back. In this state, if a vehicle collision occurs, as the air bags respectively arranged in the existing fixed air bag mechanisms 1 and 2 are actuated, the air bag 22b arranged in the portable air bag mechanism 20b which is hung on the hanger member 4 is inflated and deployed to protect the child occupant from being bumped against the front seat back.

Figure 5:
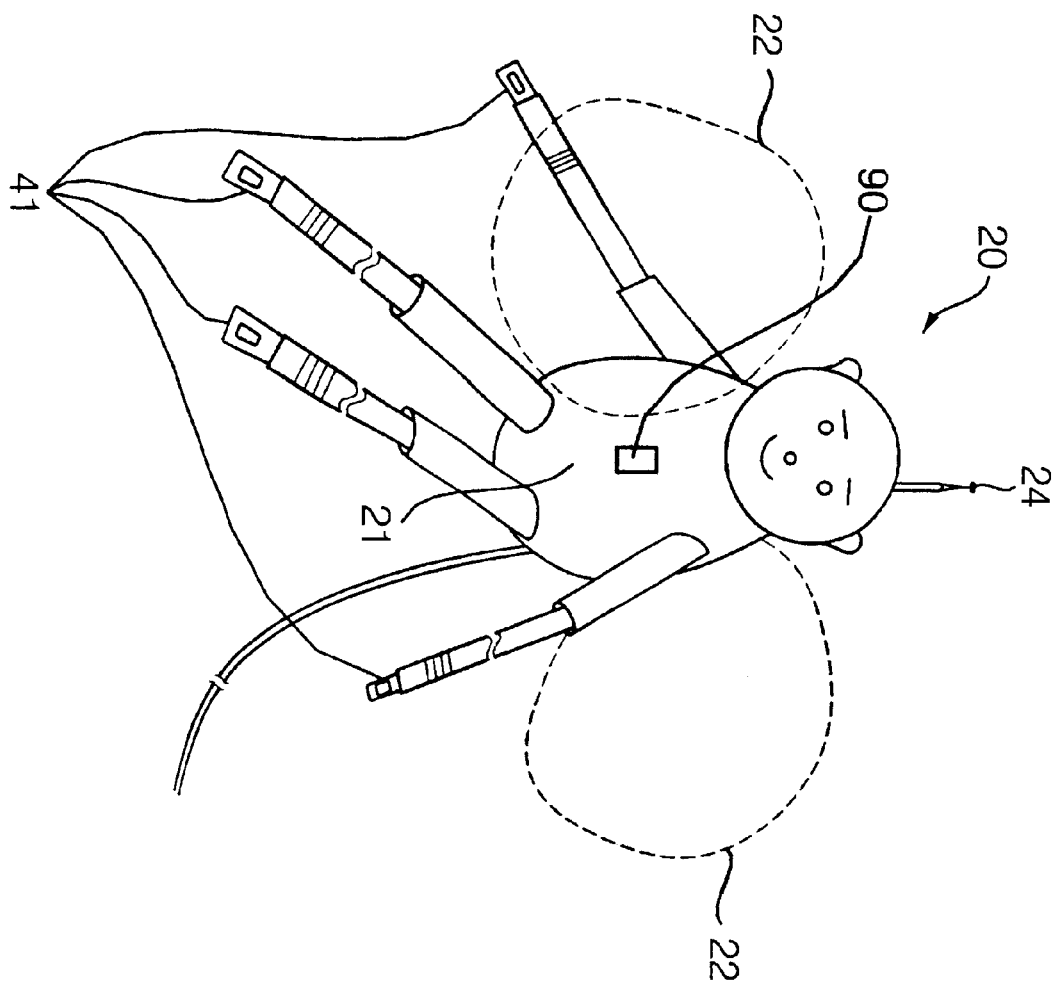
FIG. 5 is a schematic perspective view illustrating a state wherein portable air bags according to the present invention are inflated.

FIG. 5 is a schematic perspective view illustrating a state wherein portable air bags according to the present invention are inflated. As shown in FIG. 5, the portable air bag 22 can be arranged in front of or behind the air bag body 21 of the portable air bag mechanism 20. Also, the portable air bag 22 can be arranged in a front portion or a rear portion of the air bag body 21 of the portable air bag mechanism 20. The portable air bag 22 is inflated and deployed forward or rearward.

The portable air bag mechanism 20 is connected with the fixed air bag mechanisms 1 and 2 through wired and/or wireless communication. By this fact, if the fixed air bag mechanisms 1 and 2 are actuated, the portable air bag mechanism 20 is actuated within 78 milliseconds thereafter.

It is preferred that the portable air bag mechanism 20 is manufactured to have a size which does not obstruct the occupant's field of view.

Since the portable air bag mechanism 20 can be actuated through wired or wireless communication means by inserting a connection terminal (not shown) into a connection jack (not shown) in which communication means standardized with the fixed air bag mechanisms 1 and 2 already mounted to the motor vehicle is disposed, the occupant can ride on another vehicle while carrying the portable air bag mechanism 20.

Further, in the case that the portable air bag system according to the present invention is applied to a bus, because connection jacks can be arranged for respective seats and wired communication means can be easily connected to the connection jacks, it is possible to simultaneously use a plurality of air bag mechanisms. Besides, by employing wireless communication means which is capable of recognizing an inherent serial number of a corresponding bus, the plurality of air bag mechanisms can be actuated simultaneously with the fixed air bag mechanisms 1 and 2 already mounted to the vehicle, that is, the impact sensor 11.

In particular, because the belts 41 and 42 made of resilient material are connected to the portable air bag mechanism 20, when the portable air bag mechanism 20 is put on the occupant, the occupant can move the portable air bag mechanism 20 from the body within a predetermined range, while ensuring that the portable air bag mechanism 20 is not freed from the body of the occupant and the air bag 22 is reliably actuated to protect the occupant.

Meanwhile, differently from the above-described embodiments, irrespective of actuation of the fixed air bag mechanisms 1 and 2 already mounted to the motor vehicle, an impact sensor (not shown) can be separately installed to sense a vehicle collision. In this case, if a vehicle collision is sensed by the separate sensor, an actuation signal is transmitted to the portable air bag mechanism 20 through wired or wireless communication. Then, by the signal received by the transmitter/receiver unit 24 of the portable air bag mechanism 20, the air bag 22 arranged in the portable air bag mechanism 20 can be actuated.

As apparent from the above description, the portable air bag system according to the present invention provides advantages in that an air bag is disposed in a plaything such as a doll, a robot and the like, in such a way as to be carried and moved by an occupant of a motor vehicle. When an impact is sensed by an impact sensor which functions to actuate a fixed air bag mechanism already mounted to a motor vehicle, an actuation signal is applied to a portable air bag mechanism, and then, the air bag which is arranged in the portable air bag mechanism is inflated and deployed to protect the occupant. Therefore, it is not necessary to separately install a sensor for sensing a vehicle impact. In the case that a separate impact sensor is used, the portable air bag system according to the present invention can be actuated only by the one sensor.

Also, since the occupant can ride on the motor vehicle while carrying an air bag which has an identification key, it is not necessary to separately install an air bag for each seat, and therefore, by eliminating the necessity of installing a number of air bags, a cost can be saved.

In the meanwhile, because the portable air bag system according to the present invention is designed to have a toy-like or a plaything-like configuration for suiting children's tastes, a child can have a merry time with the portable air bag system. By this fact, even upon putting the portable air bag system on a child using belts, the child will not develop a hatred for the portable air bag system. Thereafter, when the child is bored with playing with the portable air bag system, by hanging the portable air bag system on a front seat back, the portable air bag system can render a pleasant outer appearance and at the same time can perform a function of an air bag.

Further, due to the fact that the portable air bag mechanism according to the present invention is connected, through wired or wireless communication means, to a plurality of fixed air bag mechanisms already mounted to the motor vehicle, upon occurrence of a collision, if at least one of the fixed air bag mechanisms is actuated, the portable air bag mechanism is actuated within 78 milliseconds, whereby improved operational reliability can be stably obtained.

In addition, by the fact that the portable air bag system according to the present invention can be actuated by a wired communication method in which standardized communication means for enabling air bag actuation is installed on the motor vehicle and a wired cable is inserted in a connection jack or by a highly precise wireless communication method, even in the case that the occupant carrying the portable air bag system according to the present invention rides on another motor vehicle, the portable air bag system can be reliably actuated.

Moreover, in the case that an impact sensor and a plurality of portable air bag mechanisms, and the existing fixed air bag mechanism and the plurality of portable air bag mechanisms are respectively connected with each other through wireless communication means, by separately applying or combinedly applying a channel code suitable for a communication channel characteristic, a channel decoder device, a function of repeatedly transmitting the same signal, a message re-transmitting mode, and so forth, reliability of wireless communication can be further improved.

Furthermore, in the present invention, an identification key module is mounted to the motor vehicle to generate inherent serial numbers which are different one with another in every motor vehicle, and identification key sensing means is attached to the portable air bag system. Thus, since it is possible to identify and verify an inherent serial number, independence is ensured in that the portable air bag system is actuated by receiving only a signal transmitted from the corresponding motor vehicle, and, at the same time, compatibility between another motor vehicle and the portable air bag system can be guaranteed by the presence of the identification key module and the identification key sensing means.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A portable air bag system comprising:
   impact sensing means operated independently from or in cooperation with at least one fixed air bag mechanism mounted to a motor vehicle, for sensing a vehicle collision;
   a portable air bag mechanism capable of being carried and moved by a vehicle occupant, the portable air bag mechanism having arranged therein an air bag which is inflated and deployed upon occurrence of the vehicle collision, the portable airbag mechanism being in communication with the fixed airbag mechanism so that the portable airbag mechanism can be actuated within 78 milliseconds after the fixed airbag mechanism is actuated; and
   control means for applying an actuating signal to the portable air bag mechanism when the vehicle collision is sensed by the impact sensing means, and thereby allowing the air bag arranged in the portable air bag mechanism to be inflated and deployed.

2. The portable air bag system as set forth in claim 1, wherein the impact sensing means comprises an impact sensor which generates an electrical signal upon occurrence of the vehicle collision.

3. The portable air bag system as set forth in claim 1, wherein a plurality of portable air bag mechanisms are located in the motor vehicle so that a number of occupants can use the portable air bag mechanisms at different positions, respectively.

4. The portable air bag system as set forth in claim 1, wherein the portable air bag mechanism is connected with the fixed air bag mechanism through wired communication.

5. The portable air bag system as set forth in claim 1, wherein the portable air bag mechanism is connected with the fixed air bag mechanism through wireless communication.

6. The portable air bag system as set forth in claim 1, wherein the portable air bag mechanism is connected with a plurality of fixed air bag mechanisms mounted to the motor vehicle, through wired or wireless communication, so that, upon occurrence of the vehicle collision, when at least one of the fixed air bag mechanisms is actuated, the portable air bag mechanism is actuated.

7. The portable air bag system as set forth in claim 1,
   wherein actuation and an operational status of the portable air bag mechanism are adjusted depending upon at least one of a posture and a physical condition of an occupant, existence of a child seat and a hardness of a colliding object.

8. The portable air bag system as set forth in claim 1, wherein the portable air bag mechanism comprises:
   an air bag body;
   an air bag arranged in the air bag body, for being inflated and deployed by gas flowed therein through an inflator;
   a transmitter/receiver unit positioned on a side of the air bag body, for wirelessly receiving an actuation signal upon occurrence of the collision and transmitting the actuation signal to an internal communication device so that the air bag is actuated under the control of the control means; and
   a wired communication cable for wiredly connecting the internal communication device and the control means with each other, upon occurrence of the collision, so that the air bag is actuated under the control of the control means.

9. The portable air bag system as set forth in claim 8, further comprising:
   an identification key module mounted to the motor vehicle, for storing therein an inherent serial number of the motor vehicle.

10. The portable air bag system as set forth in claim 9, wherein the portable air bag mechanism further includes an identification key verifying means for verifying the inherent serial number of the motor vehicle.

11. The portable air bag system as set forth in claim 10, wherein the portable air bag mechanism is constructed in a manner such that it can be actuated after verifying the inherent serial number from the identification key module installed on the motor vehicle in which the portable air bag mechanism is positioned.

12. The portable air bag system as set forth in claim 8, wherein the air bag body and the air bag can be disassembled from each other to be changed with new ones.

13. The portable air bag system as set forth in claim 8, wherein the air bag body has a variety of configurations such as a doll, a robot, a cushion, a pillow and a toy.

14. The portable air bag system as set forth in claim 1, wherein the portable air bag mechanism is provided with fastening means for allowing the portable air bag mechanism to be fastened with respect to the body of the occupant or a front seat back, so that the portable air bag mechanism is prevented from being freed from the body of the occupant.

15. The portable air bag system as set forth in claim 14, wherein the fastening means comprises main belts connected to the portable air bag mechanism and auxiliary belts formed separately from the main belts and locked at their both ends to the main belts to fasten the portable air bag mechanism with respect to the body of the occupant; or the fastening means comprises a hanger member which is attached to the front seat back to hang the portable air bag mechanism.

16. A portable air bag system comprising:

impact sensing means operated independently from or in cooperation with at least one fixed air bag mechanism mounted to a motor vehicle, for sensing a vehicle collision;

a portable air bag mechanism capable of being carried and moved by a vehicle occupant, the portable air bag mechanism having arranged therein an air bag which is inflated and deployed upon occurrence of the vehicle collision; and control means for applying an actuating signal to the portable air bag mechanism when the vehicle collision is sensed by the impact sensing means, and thereby allowing the air bag arranged in the portable air bag mechanism to be inflated and deployed;

wherein the portable air bag mechanism is provided with fastening means for allowing the portable air bag mechanism to be fastened with respect to the body of the occupant or a front seat back, so that the portable air bag mechanism is prevented from being freed from the body of the occupant; and wherein the main belts are connected to the portable air bag mechanism to serve as both hand parts and both foot parts of the portable air bag mechanism, respectively; and the auxiliary belts define an X-shaped contour and locked at their both ends to the main belts.

17. A portable air bag system comprising:

impact sensing means operated independently from or in cooperation with at least one fixed air bag mechanism mounted to a motor vehicle, for sensing a vehicle collision;

a portable air bag mechanism capable of being carried and moved by a vehicle occupant, the portable air bag mechanism having arranged therein an air bag which is inflated and deployed upon occurrence of the vehicle collision; and control means for applying an actuating signal to the portable air bag mechanism when the vehicle collision is sensed by the impact sensing means, and thereby allowing the air bag arranged in the portable air bag mechanism to be inflated and deployed;

wherein the portable air bag mechanism is provided with fastening means for allowing the portable air bag mechanism to be fastened with respect to the body of the occupant or a front seat back, so that the portable air bag mechanism is prevented from being freed from the body of the occupant; and wherein the main belts and the auxiliary belts are made of resilient material so that the occupant can move the portable air bag mechanism from the body within a predetermined range.

18. The portable air bag system as set forth in claim 1, wherein the control means comprises a control section, the control section, which receives a signal from the impact sensing means when the vehicle collision is sensed by the impact sensing means, enabling the air bag to be actuated by the medium of wireless communication through a transmitter/receiver unit positioned on a side of the portable air bag mechanism and an internal communication device disposed in the portable air bag mechanism, or the control section being connected with the internal communication device by a wired communication cable and enabling the air bag to be actuated by the medium of wired communication through the control section and the internal communication device.

19. The portable air bag system as set forth in claim 18, wherein a transmitting message, which is outputted from the control section to actuate the air bag, is repeatedly transmitted through several times, so as to improve reliability of wired and wireless communication.

20. The portable air bag system as set forth in claim 18, wherein a transmitting message, which is outputted from the control section to actuate the air bag, passes through a channel coder and a channel decoder which are suitable for a communication channel characteristic, so as to improve reliability of wired and wireless communication.

\* \* \* \* \*